United States Patent
Oh et al.

(10) Patent No.: US 10,111,253 B2
(45) Date of Patent: Oct. 23, 2018

(54) METHOD AND APPARATUS FOR INTERFERENCE ALIGNMENT AND MULTI-ANTENNA SIGNAL PROCESS IN WIRELESS NETWORK

(71) Applicant: ELECTRONICS AND TELECOMMUNICATIONS RESEARCH INSTITUTE, Daejeon (KR)

(72) Inventors: Jin Hyung Oh, Daejeon (KR); Sang Woon Jeon, Andongsi (KR); Myung Sun Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 46 days.

(21) Appl. No.: 15/172,466

(22) Filed: Jun. 3, 2016

(65) Prior Publication Data
US 2016/0359606 A1  Dec. 8, 2016

(30) Foreign Application Priority Data

Jun. 5, 2015  (KR) .......................... 10-2015-0079651

(51) Int. Cl.
*H04W 28/02* (2009.01)
*H04W 40/24* (2009.01)
(Continued)

(52) U.S. Cl.
CPC ...... *H04W 74/0833* (2013.01); *H04B 7/0617* (2013.01); *H04L 5/0023* (2013.01); *H04L 5/0032* (2013.01); *H04L 5/0073* (2013.01)

(58) Field of Classification Search
CPC ......... H04W 28/0221; H04W 28/0252; H04W 40/248; H04W 52/021
See application file for complete search history.

(56) References Cited

U.S. PATENT DOCUMENTS

2010/0002575 A1* 1/2010 Eichinger ............. H04L 5/0046
370/210
2010/0184436 A1* 7/2010 Tachikawa ............ H04W 36/22
455/436
(Continued)

FOREIGN PATENT DOCUMENTS

KR   10-2011-0065036   6/2011
KR   10-2013-0112743   10/2013
(Continued)

OTHER PUBLICATIONS

Jeon, Degrees of Freedom of Uplink-Downlink Multiantenna Cellular Networks, Apr. 24, 2014.*
(Continued)

*Primary Examiner* — Ronald B Abelson
(74) *Attorney, Agent, or Firm* — Kile Park Reed & Houtteman PLLC (57) ABSTRACT

Provided is a communication method in a wireless communication system using an interference alignment. The method includes: receiving, by a first AP, a data stream by using $N_1$ (natural number) first reception antennas, and receiving, by a second AP, the data stream by using $N_2$ (natural number) second reception antennas, in a wireless communication system including the first AP and the second AP which receive the data stream through a transmission beam which one or more user terminals having m (natural number) transmission antennas within a given number transmit; and updating to selectively add a part of user terminals which are newly connected to the first AP and the second AP to a set of connected user terminal, and transmitting, by each terminal of the set of connected user terminal, linearly independent transmission beams by applying an interference alignment with respect to a plurality of the first and the
(Continued)

second reception antennas for the updated set of connected user terminal.

10 Claims, 7 Drawing Sheets (51) Int. Cl.
*H04W 52/02* (2009.01)
*H04W 74/08* (2009.01)
*H04B 7/06* (2006.01)
*H04L 5/00* (2006.01)

(56) References Cited

U.S. PATENT DOCUMENTS

| | | | |
|---|---|---|---|
| 2010/0202391 A1* | 8/2010 | Palanki | H04W 72/0426 370/329 |
| 2013/0078991 A1 | 3/2013 | Nam | |
| 2014/0294109 A1 | 10/2014 | Cheong et al. | |
| 2014/0349581 A1* | 11/2014 | Oh | H04L 25/03343 455/63.1 |

FOREIGN PATENT DOCUMENTS

| | | |
|---|---|---|
| KR | 10-2014-0093892 | 7/2014 |
| KR | 10-2014-0136673 | 12/2014 |

OTHER PUBLICATIONS

Hojoong Kwon et al., "Opportunistic Multi-Channel CSMA Protocol for OFDMA Systems"; IEEE Transactions on Wireless Communications, vol. 9, No. 5, May 2010, pp. 1552-1557.

\* cited by examiner

METHOD AND APPARATUS FOR INTERFERENCE ALIGNMENT AND MULTI-ANTENNA SIGNAL PROCESS IN WIRELESS NETWORK

CROSS-REFERENCE TO RELATED APPLICATION

This application claims the benefit of priority to Korean Patent Application No. 10-2015-0079651, filed on Jun. 5, 2015 in the Korean Intellectual Property Office, the disclosure of which is incorporated herein in its entirety by reference.

BACKGROUND OF THE INVENTION

Field of the Invention

The present disclosure relates to a method and an apparatus for an interference alignment and a multi-antenna signal processing in a multi-cell random access wireless network environment such as a wireless LAN, and more particularly, to a method and an apparatus for an interference alignment and a multi-antenna signal processing in a wireless communication system on a multi-cell random access wireless network configured of access points having a plurality of antennas and user terminals having different numbers of antennas.

Description of the Related Art

Figure 1:
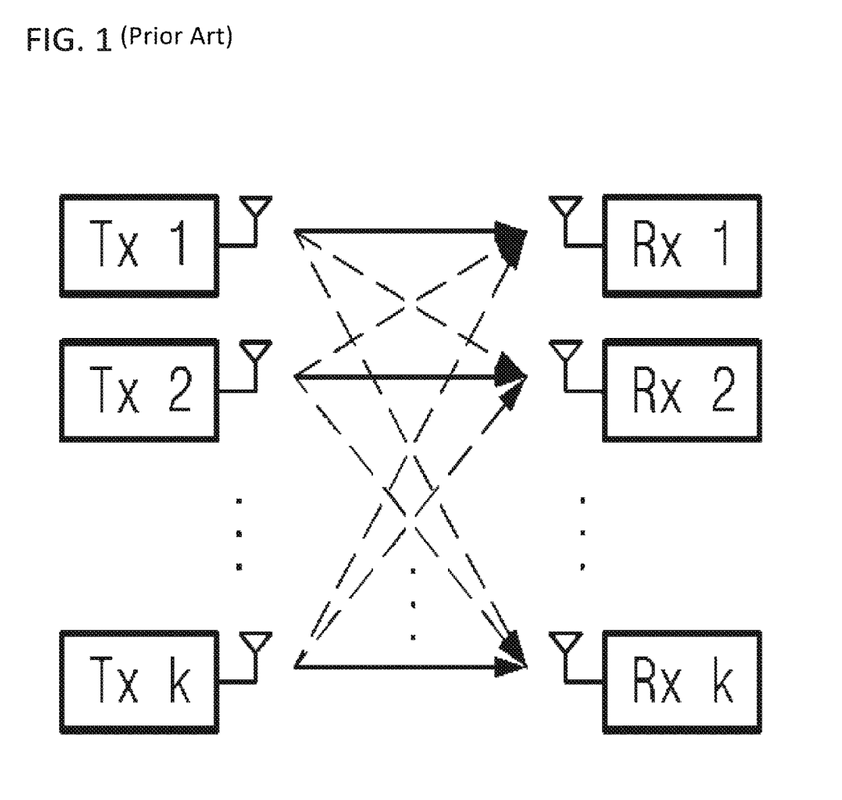
FIG. 1 is a diagram illustrating a K-user interference channel model and the degree of freedom in a conventional wireless communication system.

As shown in FIG. 1, in a wireless communication system configured of K transmitters (Tx) and K receivers (Tx) in a multi-cell wireless network environment, an interference between channels occurs when each cell of each transmitter (Tx) transmits a message. A research for improving the degree of freedom, and the transmission rate for a multi-cell wireless network by analyzing a model for the interference channel has been progressed.

The degree of freedom of a corresponding K-user interference channel in the K transmitters (Tx) and K receivers (Tx) environment of FIG. 1 may be represented by Equation 1. Here, the SNR is a signal-to-noise ratio, and the Csum (SNR) is a sum of a transmission capacity of total interference channel.

$$\lim_{SNR \to \infty} \frac{C_{sum}(SNR)}{\log SNR} \qquad \text{[Equation 1]}$$

That is, the degree of freedom of interference channel is a key measure to determine the magnitude of a transmission gain in comparison with a single user in a large SNR area.

As shown in FIG. 1, since the wireless channel has a characteristic of receiving a signal of the transmitter (Tx) by all receivers, with respect to the case of transmitting a message to a specific separated receiver (Rx) by the transmitter (Tx), many experts predicted that the degree of freedom (DoF) of K-user interference channel is 1.

However, beyond the predictions of many experts, the Syed Jafar research group of University of California, Irvine derived a new interference control paradigm called an interference alignment in 2008, and it turned out that the degree of freedom in the K-user interference channel like FIG. 1 is K/2. For example, in a wireless communication system as shown in FIG. 1, four separated data stream may be transmitted by using the interference alignment in the 3-user interference channel (k=3), that is, the degree of freedom 4/3 may be achieved.

Interference alignment that began as a signal space interference alignment based on a beam forming is developed to a technique such as a real interference alignment, an ergodic interference alignment, and the like by many research groups. Further, an improved method for improving the degree of freedom as users are increased is required in consideration of uplink or downlink in a multi-cell or a single-cell wireless network environment. In addition, in a carrier sense multiple access (CSMA) random access environment, or an orthogonal frequency division multiplexing (OFDM) environment, although a research on opportunistic random access technique which induces a user having a large channel gain to access first an access point stochastically by controlling a backoff time of a user terminal is progressed, an improved method for improving the degree of freedom as users are increased is required.

SUMMARY OF THE INVENTION

The present disclosure has been made in view of the above problems, and provides a method and an apparatus for an interference alignment and a multi-antenna signal processing capable of providing a service having a high degree of freedom by selecting a user terminal which connects to an AP cell having the less connected user terminal, among newly connected user terminals, in consideration of the number of user terminals currently connected to the access points, when new user terminals are connected to the access point, updating the selected user terminal to be added to a set of service users, and managing a signal area to be used by user terminals and an area of an interference space, in a wireless communication system on a multi-cell random access wireless network configured of access points having a plurality of antennas and user terminals having different numbers of antennas.

In accordance with an aspect of the present disclosure, a communication method in a wireless communication system using an interference alignment includes: receiving, by a first AP, a data stream by using $N_1$ (natural number) first reception antennas, and receiving, by a second AP, the data stream by using $N_2$ (natural number) second reception antennas, in a wireless communication system including the first AP and the second AP which receive the data stream through a transmission beam which one or more user terminals having m (natural number) transmission antennas within a given number transmit; and updating to selectively add a part of user terminals which are newly connected to the first AP and the second AP to a set of connected user terminal, and transmitting, by each terminal of the set of connected user terminal, linearly independent transmission beams by applying an interference alignment with respect to a plurality of the first and the second reception antennas for the updated set of connected user terminal. Transmitting linearly independent transmission beams includes applying the interference alignment to use a signal space in a preset order, when a user terminal connected to any one of the first or the second AP uses a portion of a signal space that the other of the adjacent first or second AP forms. The method further includes applying the interference alignment by adding a signal space of a corresponding user terminal according to an occurrence of a user terminal which terminates a service through the first or the second AP. When user terminals newly connected to the first AP and the second AP exist, transmitting linearly independent transmission beams includes comparing the number of the user terminal already connected to each AP, and updating to add one or more user terminals connected to an AP having the number of the less connected user terminal among the newly connected user terminals to the set of connected user terminal. The method further includes selecting the user terminal having the largest numbers of transmission antennas among the newly connected user terminals and adding the selected user terminal to the set of connected user terminal. When the number of the transmission antennas of a corresponding user terminal connected to one of the first or the second AP is larger than the number of the reception antennas of the other AP to which the corresponding user terminal does not connected, transmitting linearly independent transmission beams includes applying an interference nulling with respect to all transmission beams to the one AP, by the user terminals connected to the other AP. When the number of the transmission antennas of a corresponding user terminal connected to any one of the first or the second AP is equal to or less than the number of the reception antennas of the other AP to which the corresponding user terminal does not connected, transmitting linearly independent transmission beams includes applying an interference nulling with respect to the transmission beams to the any one AP, by the user terminal having smaller number of the transmission antenna than that of the corresponding user terminal among the user terminals connected to the other AP.

In accordance with another aspect of the present disclosure, a wireless communication system using an interference alignment includes: a first AP and a second AP configured to receive a data stream through a transmission beam which one or more user terminals having m (natural number) transmission antennas within a given number transmit, wherein the first AP receives the data stream by using $N_1$ (natural number) first reception antennas and the second AP receives the data stream by using $N_2$ (natural number) second reception antennas; and a controller configured to update to selectively add a part of user terminals which are newly connected to the first AP and the second AP to a set of connected user terminal, and set each terminal of the set of connected user terminal to transmit linearly independent transmission beams by applying an interference alignment with respect to a plurality of the first and the second reception antennas for the updated set of connected user terminal. The controller applies the interference alignment to use a signal space in a preset order, when a user terminal connected to any one of the first or the second AP uses a portion of a signal space that the other of the adjacent first or second AP forms. The controller applies the interference alignment by adding a signal space of a corresponding user terminal according to an occurrence of a user terminal which terminates a service through the first or the second AP. When user terminals newly connected to the first AP and the second AP exist, the controller compares the number of the user terminal already connected to each AP, and updates to add one or more user terminals connected to an AP having the number of the less connected user terminal among the newly connected user terminals to the set of connected user terminal. The controller selects the user terminal having the largest numbers of transmission antennas among the newly connected user terminals and adds the selected user terminal to the set of connected user terminal. When the number of the transmission antennas of a corresponding user terminal connected to one of the first or the second AP is larger than the number of the reception antennas of the other AP to which the corresponding user terminal does not connected, the controller controls to apply an interference nulling with respect to all transmission beams to the one AP by the user terminals connected to the other AP. When the number of the transmission antennas of a corresponding user terminal connected to any one of the first or the second AP is equal to or less than the number of the reception antennas of the other AP to which the corresponding user terminal does not connected, the controller controls to apply an interference nulling with respect to the transmission beams to the any one AP by the user terminal having smaller number of the transmission antenna than that of the corresponding user terminal among the user terminals connected to the other AP.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

First, the notation defined as described below is used for a description of the present disclosure. That is, [1:n] means $\{1, 2, \ldots, n\}$. For $i \in [1:2]$, $\bar{i} \in [1:2]$ has a relationship of $\bar{i} \notin i$. For a matrix A, $[A]_{1:n}$ means a sub-matrix formed of first row vector to n-th row vector. For a vector a, $[a]_{1:n}$ means a sub-vector formed of first component to n-th component. In addition, $[A]_n$ means n-th row vector, $[a]_n$ means n-th component. The 0 n means n×1 all-zero vector. $A^T$ means Transpose and $A^H$ means Conjugate Transpose.

Figure 2:
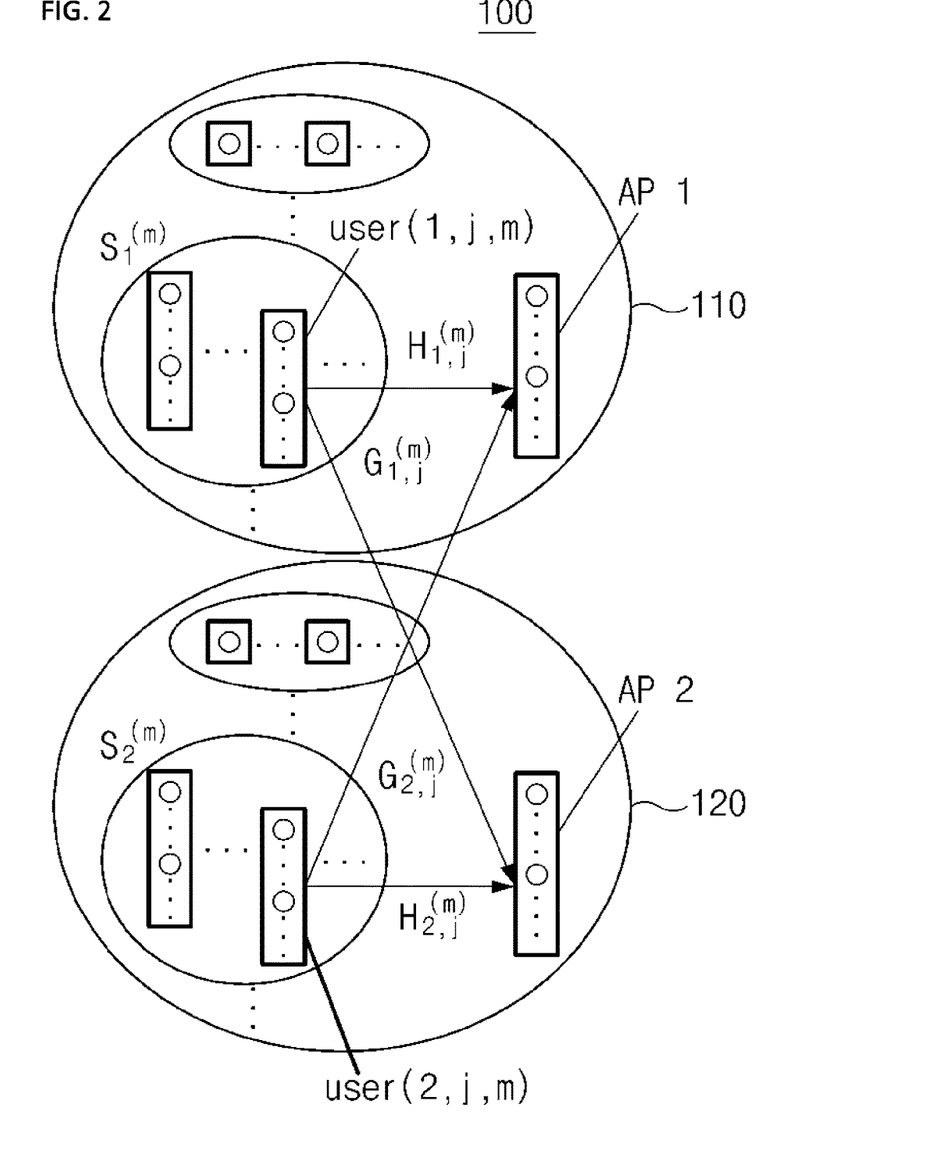
FIG. 2 is a diagram illustrating a wireless communication system on a multi-cell random access wireless network configured of access points having a plurality of antennas and user terminals having different numbers of antennas according to an embodiment of the present disclosure.

FIG. 2 is a diagram illustrating a wireless communication system 100 on a multi-cell random access wireless network configured of access points (AP1, AP2) having a plurality of antennas and user terminals (i, j, m) having different numbers of antennas according to an embodiment of the present disclosure.

In FIG. 2, a first AP (AP1) has $N_1$ (natural number) reception antennas, and communicates with user terminals (i=1, j, m) having m (natural number) (transmission) antennas in a first AP cell 110, and a second AP (AP2) has N(natural number) reception antennas, and communicates with user terminals (i=2, j, m) having m(natural number) antennas in a second AP cell 120. Hereinafter, two cells 110 and 120 are illustrated, but the interference alignment method of the present disclosure can be extensively applied to much more cells in a similar way. Here, the first AP cell 110 is a coverage area of the first AP (AP1), and the second AP cell 120 is a coverage area of the second AP (AP2).

At this time, a set of user terminals having m antennas of i-th cell is denoted as $Si^{(m)}$. $i \in [1:2]$, $m \in [1:m_{max}]$, and the $m_{max}$ is a maximum value (natural number) of the transmission antennas of the user terminal that can be previously determined. For convenience, j-th user terminal of $Si^{(m)}$ receiving a service is denoted as "user terminal (i, j, m)".

The present invention assumes a slot-based data transmission, and some user terminals terminate the service and new user terminal tries to connect to each AP(AP1, AP2) for every slot. $Si^{(m)}$ may be configured by selecting a part of the user terminal which did not completed the service in the previous slot and the user terminals which newly attempted to connect to i-th AP. The configuration of $Si^{(m)}$ is described in detail in the below described interference alignment method.

In the present disclosure, a transmission and reception data or a message (communication signal) between the user terminal (i, j, m) and the AP (AP1, AP2) may be a signal for a wireless mobile communication according to the protocol of WCDMA, LTE, and the like. In addition, in some cases, it may be a signal for a wireless short range communication such as WiFi, Bluetooth, Zigbee, etc., and may be widely applied to a signal for other wireless communications. In addition, the access point (AP) (AP1, AP2) may be a router or a small cell base station such as a femto cell/pico cell which transmits and receives such a communication signal with the user terminal (i, j, m), and, in some cases, it may be a macro base station or its relay.

Assuming that each AP(AP1, AP2) and the user terminal (i, j, m) previously obtain and know channel information of the transmission and reception message, a signal $y_i$ received by each AP(AP1, AP2) is shown in Equation 2 with respect to $i \in [1:2]$.

$$y_i = \sum_{m=1}^{m_{max}} \sum_{j \in S_i^{(m)}} H_{i,j}^{(m)} x_{i,j}^{(m)} + \sum_{m=1}^{m_{max}} \sum_{j \in S_{\bar{i}}^{(m)}} G_{\bar{i},j}^{(m)} x_{\bar{i},j}^{(m)} + z_i \quad \text{[Equation 2]}$$

Here, $H_{i,j}^{(m)}$ is a $N_i \times m$ channel (signal) vector of a channel signal transmitted to the i-th AP from the user terminal (i, j, m), $G_{\bar{i},j}^{(m)}$ is a $N_i \times m$ channel (signal) vector of a channel signal transmitted to the i-th AP from the user terminal ($\bar{i}$, j, m), $x_{i,j}^{(m)}$ is a m×1 transmission signal of the user terminal (i, j, m), and $z_i$ is a $N_i \times 1$ Gaussian white noise signal of the i-th AP. Each user terminal should satisfy an average transmission power P when transmitting a communication signal.

Figure 3:
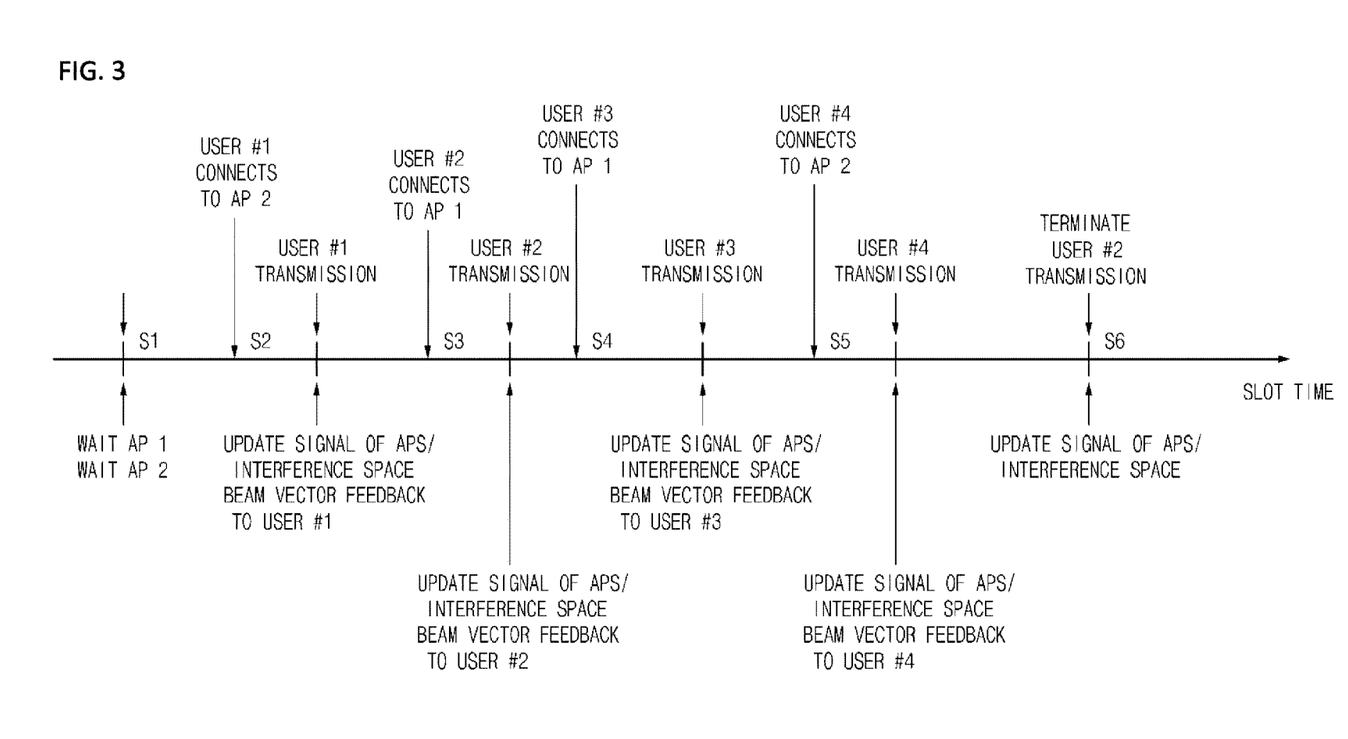
FIG. 3 is a timing diagram for illustrating a concept of a dynamic interference alignment operation in a wireless communication system according to an embodiment of the present disclosure.
Figure 4:
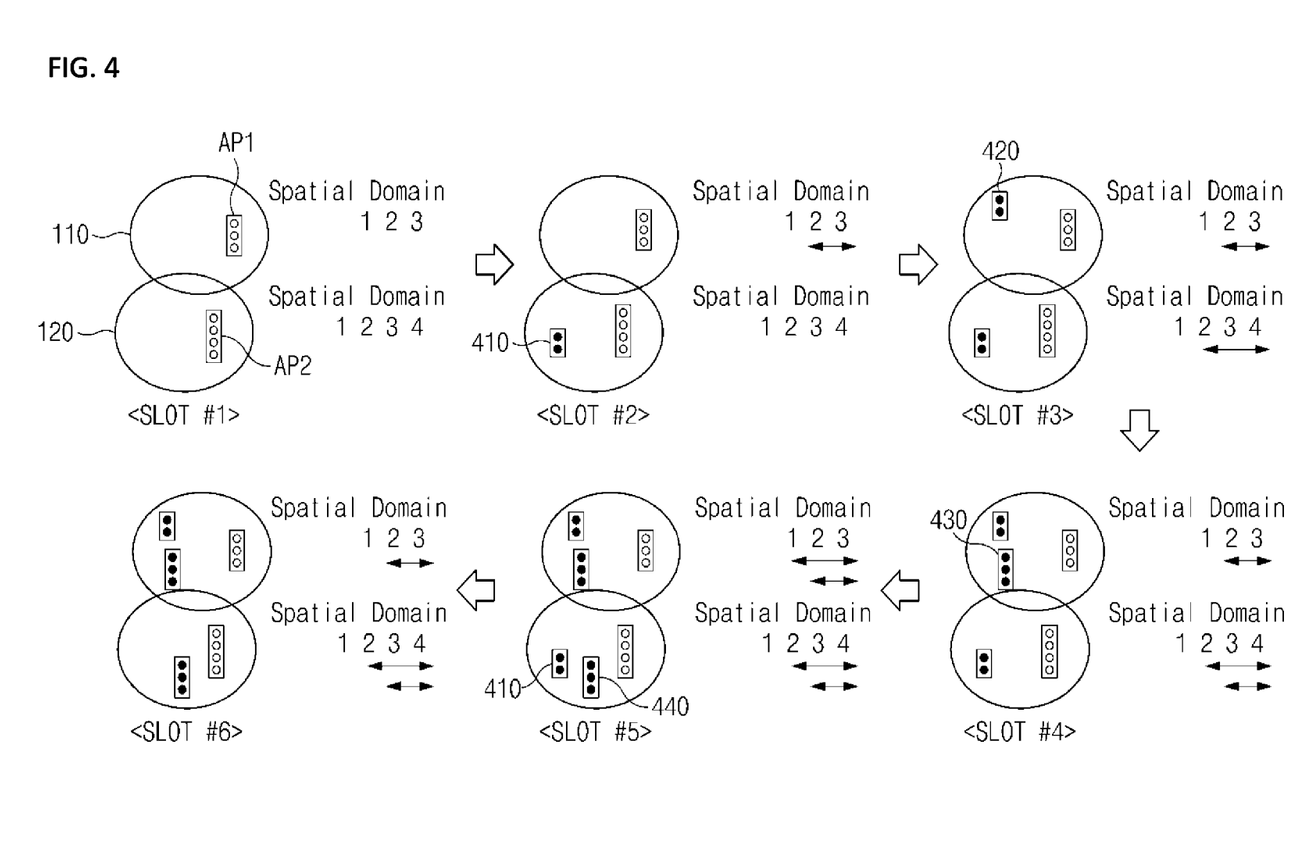
FIG. 4 is a diagram illustrating an area occupied by an interference signal for each slot time according to the dynamic interference alignment operation of FIG. 3.

FIG. 3 is a timing diagram for illustrating a concept of a dynamic interference alignment operation in a wireless communication system 100 according to an embodiment of the present disclosure, and FIG. 4 is a diagram illustrating an area occupied by an interference signal for each slot time according to the dynamic interference alignment operation of FIG. 3. The present suggests a scheduling technique to efficiently update some user terminals every slot, and also suggests a multi-antenna interference alignment technique which is effective for the updated user terminal. FIG. 3 and FIG. 4 illustrate a case, for convenience, in which the first AP (AP1) has three reception antennas and secure three signal spaces, and the second AP (AP2) has four reception antennas and secure four signal spaces. For example, the below described control of a dynamic interference alignment may be accomplished when a controller (not shown) provided in each AP, or an external controller (not shown) for generally controlling the APs transmits and receives necessary information to obtain.

In FIG. 3, first, during a first slot time (S1), each AP (AP1, AP2) waits a connection of the user terminal (see <slot#1> in FIG. 4).

In the next slot (S2), a first user terminal 410 having two transmission antennas is connected to the second AP (AP2) (see <slot#2> in FIG. 4). In this case, each AP (AP1, AP2) updates an inter-cell interference signal space and the second AP (AP2) may feedback the beam vector for the channel information to the first user terminal 410. Here, the interference alignment may be applied in such a manner that the first user terminal 410 may not transmit a corresponding communication signal to one signal space (e.g., a preset #1) among three signal spaces of the adjacent first AP (AP1). That is, the user terminal 410 may transmit a separated data stream to the second AP (AP2) through four signal spaces in the second AP (AP2) cell 120, and transmit a separated data stream to the first AP (AP1) through two signal spaces in the first AP (AP1) cell 110.

In the next slot S3, a second user terminal 420 having two transmission antennas is connected to the first AP (AP1) (see <slot#3> in FIG. 4). In this case, each AP (AP1, AP2) updates an inter-cell interference signal space and the first AP (AP1) may feedback the beam vector for the channel information to the second user terminal 420. Here, the interference alignment may be applied in such a manner that the second user terminal 420 may not transmit a corresponding communication signal to one signal space (e.g., a preset #1) among four signal spaces of the second AP (AP2).

In the next slot S4, a third user terminal 430 having three transmission antennas is connected to the first AP (AP1) (see <slot#4> in FIG. 4). In this case, each AP (AP1, AP2) updates an inter-cell interference signal space and the first AP (AP1) may feedback the beam vector for the channel information to the third user terminal 430. Here, the interference alignment may be applied in such a manner that the third user terminal 430 may not transmit a corresponding communication signal to two signal spaces (e.g., a preset #1, #2) among the four signal spaces of the second AP (AP2). When performing such an interference alignment, the interference alignment may be accomplished sequentially in a preset order from a specific signal space.

In the next slot S5, a fourth user terminal 440 having three transmission antennas is connected to the second AP (AP2) (see <slot#5> in FIG. 4). In this case, each AP (AP1, AP2) updates an inter-cell interference signal space and the second AP (AP2) may feedback the beam vector for the channel information to the fourth user terminal 440. Here, the interference alignment may be applied in such a manner that the fourth user terminal 440 may not transmit a corresponding communication signal to two signal spaces (e.g., a preset #1, #2) among the three signal spaces of the first AP (AP1). When performing such an interference alignment, the interference alignment may be accomplished sequentially in a preset order from a specific signal space.

In the final slot S6, as the first user terminal 410 having two antennas being connected to the second AP (AP2) terminates the service, the interference space which does not transmit the communication signal at the first AP (AP1) is reduced from 2 to 1, and each AP (AP1, AP2) updates the inter-cell interference signal space so that an available signal space may be more secured like the signal space of the slot time S4 (see <slot#6> in FIG. 4). Such a flexible change of the available signal space can be achieved by accomplishing the interference alignment sequentially in a preset order from a specific signal space during the interference alignment, storing corresponding information (e.g., the number of the application of the interference alignment, or information on use signal space for each terminal), and, then, adding a corresponding signal space according to the service termination of the user terminal.

Figure 5:
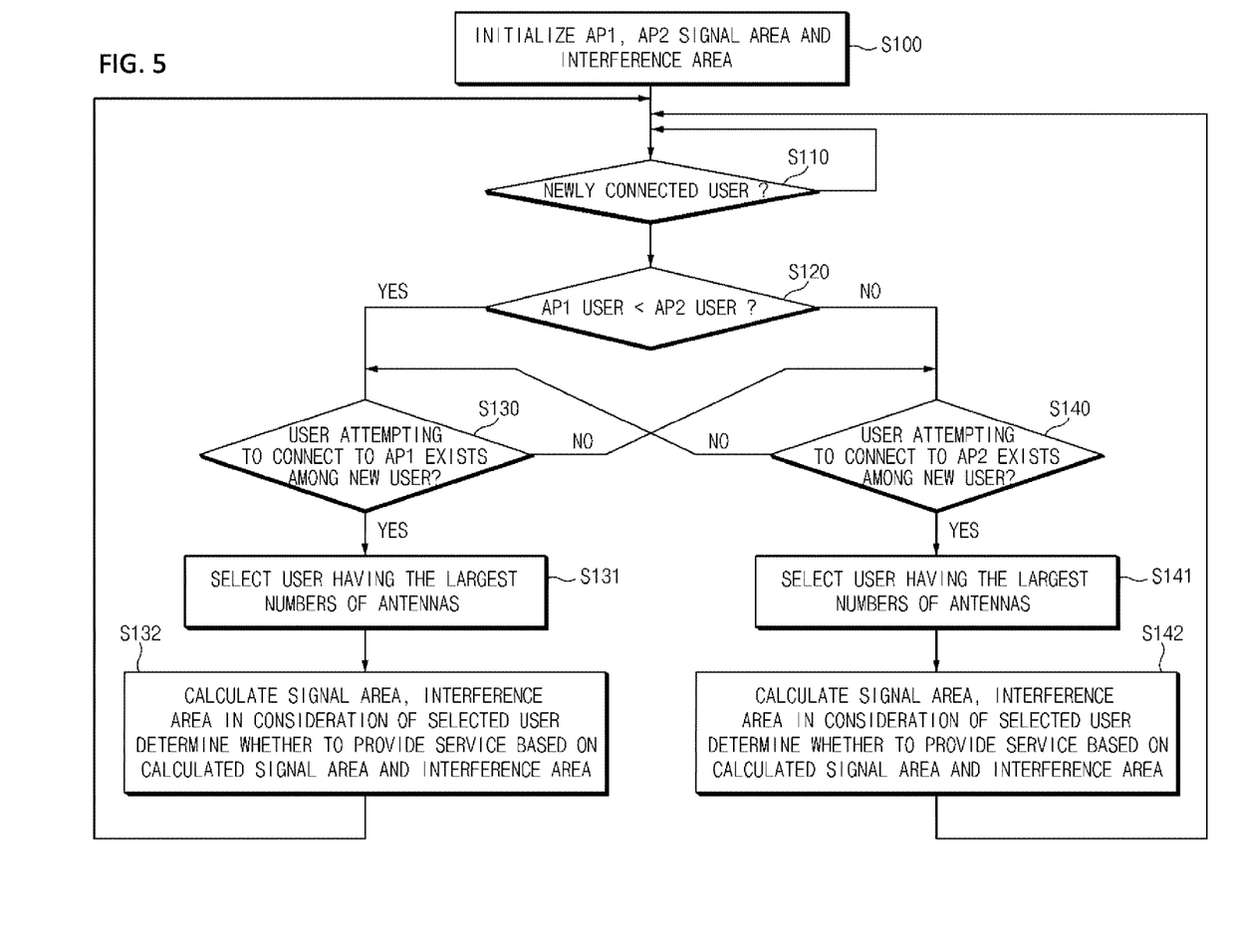
FIG. 5 is a flowchart illustrating a dynamic interference alignment operation method in a wireless communication system according to an embodiment of the present disclosure.

FIG. 5 is a flowchart illustrating a dynamic interference alignment operation method in a wireless communication system 100 according to an embodiment of the present disclosure, and FIG. 6 to FIG. 9 are examples of a pseudo code for a calculation of the interference area for reference in a dynamic interference alignment operation of FIG. 5 and an update related algorithm of the user terminal within each cell.

The dynamic interference alignment operation in a wireless communication system 100 of the present disclosure largely includes two parts. That is, (1) a user terminal scheduling to select a portion of the user terminals which is newly connected to a service excluding the user terminal already connected to the service and to update $Si^{(m)}$, and (2) a beam vector setting by a multi-antenna interference alignment application for a set of updated user terminal.

For example, the user terminal scheduling and the beam vector setting method according to the below described interference alignment operation may be performed when a controller (not shown) provided in each AP or an external controller (not shown) for overall control of APs, and the like, transmits and receives necessary information to obtain.

<Service User Terminal Update Algorithm>

First, in FIG. 5, a signal area (setting area of transmission beams transmitted to each AP by user terminals) and an area of interference space (setting area of signal interference spaces according to the number of the AP antennas) are initialized (S100).

The intra-cell 110, 120 user terminals of each AP (AP1, AP2) may receive a service by connecting to each AP (AP1, AP2) to transmit and receive a communication signal. At this time, in order to calculate the area of the interference area occupied by the interference in the signal space in order that each service user terminal can receive a service while achieving the degree of freedom 1, it is determined whether the user terminal is newly connected to each AP (AP1, AP2) (S110). Here, the determination of a new connection of the user terminal may be cyclically determined in a certain period.

Excluding user terminals $Ai^{(m)}$ having m (assuming that it is possible that the maximum value of m is $m_{max}$) transmission antennas which are already connected to each AP (AP1, AP2) and did not terminate a service, when a user terminal $Bi^{(m)}$ having m transmission antennas newly connected to each AP (AP1, AP2) exists, a given controller compares the number of user terminals that are already connected to each AP (AP1, AP2).

Accordingly, the number of the user terminals $(\Sigma_{i=1}^{m_{max}} |S_2^{(i)}|)$ connected to AP2 may be larger than the number of the user terminal $(\Sigma_{i=1}^{m_{max}} |S_1^{(i)}|)$ connected to AP1 (S120), and user terminal(s) attempting to connect to AP1 may exist among the newly connected user terminal(s) $Bi^{(m)}$ (S130). In addition, the number of the user terminals connected to AP1 may be equivalent to or larger than the number of the user terminal connected to AP2 (S120), user terminal(s) attempting to connect to AP1 may not exist among the newly connected user terminal(s) $Bi^{(m)}$ (S140), and user terminal(s) attempting to connect to AP1 may exist among the newly connected user terminal(s) $Bi^{(m)}$ (S130).

At this time, the controller may select the user terminal k (multiple available) having the largest numbers of antennas among the user terminal(s) that attempt to connect to the AP1 (S131), a corresponding user terminal k among $Bi^{(m)}$ may be added to $Ai^{(m)}$ to update $Si^{(m)}$ (add k to $S1^{(m)}$), the signal area used by the updated user terminals $Si^{(m)}$ and the area of the interference space may be calculated according to a certain algorithm, and, based on this, each AP (AP1, AP2) is able to provide the service to the updated user terminals $Si^{(m)}$ (S132).

Similarly, at step S120, the number of the user terminals $(\Sigma_{i=1}^{m_{max}} |S_1^{(i)}|)$ connected to AP1 may be equivalent to or larger than the number of the user terminal $(\Sigma_{i=1}^{m_{max}} |S_2^{(i)}|)$ connected to AP2. At this time, user terminal(s) attempting to connect to AP2 may exist among the newly connected user terminal(s) $Bi^{(m)}$ (S140). In addition, the number of the user terminals connected to AP2 may be larger than the number of the user terminal connected to AP1 (S120), user terminal(s) attempting to connect to AP1 may not exist among the newly connected user terminal(s) $Bi^{(m)}$ (S130), and user terminal(s) attempting to connect to AP2 may exist among the newly connected user terminal(s) $Bi^{(m)}$ (S140).

At this time, the controller may select the user terminal k (multiple available) having the largest numbers of transmission antennas among the user terminal(s) that attempt to connect to the AP2 (S141), a corresponding user terminal k among $Bi^{(m)}$ may be added to $Ai^{(m)}$ to update $Si^{(m)}$ (add k to $S2^{(m)}$), the signal area used by the updated user terminals $Si^{(m)}$ and the area of the interference space may be calculated according to a certain algorithm, and, based on this, each AP (AP1, AP2) is able to provide the service to the updated user terminals $Si^{(m)}$ (S142).

As described above, when the user terminal is newly connected to each AP(AP1, AP2) according to the service user terminal update algorithm of the present disclosure, among the newly connected user terminal(s), the user terminal k (one or more terminals having the largest numbers of transmission antennas) which connect the AP cell having the less numbers of connected user terminal are selected and updated to be added to $Si^{(m)}$, and the signal area to be used by the user terminals and the area of the interference space may be managed and serviced so that the service having a high degree of freedom may be provided.

<Interference Alignment Technique>

In each service user terminal set $\{S_1^{(m)}\}_{m \in [1:m_{max}]}$, $\{S_2^{(m)}\}_{m \in [1:m_{max}]}$ receiving the service by the above user terminal update algorithm, each user terminal may obtain the degree of freedom 1 and perform a communication.

To this end, as described below, the interference alignment technique and the multi-antenna decoding technique of each AP (AP1, AP2) receiver are suggested.

First, the transmitter of the user terminals (i, j, m) transmits a communication signal through the transmission beam $x_{i,j}^{(m)}$ as shown in Equation 3.

$$x_{i,j}^{(m)} = \gamma_{i,j}^{(m)} v_{i,j}^{(m)} s_{i,j}^{(m)}$$ [Equation 3]

Here, $v_{i,j}^{(m)}$ and $s_{i,j}^{(m)}$ are a m×1 transmission beam vector of user (i, j, m) and a corresponding data (signal) stream having an average transmission power P respectively. In addition, $\gamma_{i,j}^{(m)}$ is set to $$\gamma_{i,j}^{(m)} = \frac{1}{\|v_{i,j}^{(m)}\|}$$

so that the transmission power may satisfy P.

<Case I: m>$N_i$>

In the case of Case I, since the number (m) of the transmission antennas of the user terminal (i, j, m) connected to APi (e.g., AP1) is larger than the number ($N_i$) of the reception antennas connected to AP$\bar{\imath}$ (the AP to which a corresponding user terminal is not connected), the interference due to all transmission beam in the user terminal ($\bar{\imath}$, j, m) may not influence the APi, and, as shown in Equation 4, a multiplication of a $N_i$×m channel (signal) vector $G_{\bar{\imath},j}^{(m)}$ of the channel signal transmitted from the user terminal ($\bar{\imath}$, j, m) to i-th AP with a corresponding transmission beam $v_{\bar{\imath},j}^{(m)}$ satisfies n×1 all-zero vector $0_{Ni}$. In such an interference nulling (IN) condition, it can be configured that the user terminal transmits a linearly independent corresponding transmission beam to each AP by applying the interference alignment for the multi-reception antennas ($N_1$, $N_2$) of the APs. That is, when the number (m) of the transmission antennas of the user terminal (i, j, m) connected to APi (e.g., AP1) is larger than the number ($N_i$) of the reception antennas of AP $\bar{\imath}$ (the AP to which a corresponding user terminal is not connected), the controller may prevent the interference due to a corresponding signal from influencing the AP i by applying an interference nulling with respect to the transmission beams $v_{\bar{\imath},j}^{(m)}$ that the user terminals ($\bar{\imath}$, j, m) connected to AP $\bar{\imath}$ transmit to the AP i.

$$G_{\bar{\imath},j}^{(m)} v_{\bar{\imath},j}^{(m)} = 0_{N_i}$$ [Equation 4]

Here, $G_{\bar{\imath},j}^{(m)} = [A_{\bar{\imath},j}^{(m)}, B_{\bar{\imath},j}^{(m)}]$, $A_{\bar{\imath},j}^{(m)}$, $B_{\bar{\imath},j}^{(m)}$ are defined as $N_i \times N_i$, $N_i \times (m-N_i)$ matrices respectively, $v_{\bar{\imath},j}^{(m)} = [a_{\bar{\imath},j}^{(m)T}, b_{\bar{\imath},j}^{(m)T}]^T$, and $a_{\bar{\imath},j}^{(m)}$, $b_{\bar{\imath},j}^{(m)}$ are defined as $N_i \times 1$, $(m-N_i) \times 1$ vectors respectively.

At this time, with respect to the arbitrarily selected $b_{\bar{\imath},j}^{(m)}$, $v_{\bar{\imath},j}^{(m)}$ satisfying Equation 4 is indicated in Equation 5.

$$v_{\bar{\imath},j}^{(m)} = \begin{bmatrix} -[A_{\bar{\imath},j}^{(m)}]^{-1} B_{\bar{\imath},j}^{(m)} b_{\bar{\imath},j}^{(m)} \\ b_{\bar{\imath},j}^{(m)} \end{bmatrix}$$ [Equation 5]

<Case II: m≤$N_i$>

In the case of Case II, Equation 4 cannot be satisfied, and, instead, can obtain $v_{\bar{\imath},j}^{(m)}$ satisfying Equation 6. Here, in such an interference nulling (IN) condition, it can be configured that the user terminal transmits a linearly independent corresponding transmission beam to each AP by applying the interference alignment for the multi-reception antennas ($N_1$, $N_2$) of the APs. That is, when the number (m) of the transmission antennas of the user terminal (i, j, m) connected to APi (e.g., AP1) is equal to or smaller than the number ($N_i$) of the reception antennas of AP $\bar{\imath}$ (the AP to which a corresponding user terminal is not connected), the controller may prevent the interference due to a corresponding signal from influencing the AP i by applying an interference nulling with respect to the transmission beams $v_{\bar{\imath},j}^{(m)}$ that the user terminal(s) ([1:m−1]) having smaller number of the transmission antenna than that of the user terminal (i, j, m) connected to AP i among the user terminal ($\bar{\imath}$, j, m) transmit(s) to the AP i.

$$[G_{\bar{\imath},j}^{(m)}]_{1:m-1} v_{\bar{\imath},j}^{(m)} = 0_{N_i}$$ [Equation 6]

Here, when $[G_{\bar{\imath},j}^{(m)}]_{1:m-1} = [C_{\bar{\imath},j}^{(m)}, d_{\bar{\imath},j}^{(m)}]$, $C_{\bar{\imath},j}^{(m)}$ is defined as a (m−1)×(m−1) matrix, and $d_{\bar{\imath},j}^{(m)}$ is defined as a (m−1)×1 vector, $v_{\bar{\imath},j}^{(m)}$ satisfying Equation 6 is indicated in Equation 7.

$$v_{\bar{\imath},j}^{(m)} = \begin{bmatrix} -[C_{\bar{\imath},j}^{(m)}]^{-1} d_{\bar{\imath},j}^{(m)} \\ 1 \end{bmatrix}$$ [Equation 7]

Each AP (AP1, AP2) may receive an object data stream through a zero-forcing for a signal received through Ni multi-reception antennas based on the above transmission beam(or the transmission signal). In more detail, the method for receiving a data stream of the user terminal (i, j, m) by the AP i is as follows.

First, an argmax value Li for Ni is defined in a corresponding equation as indicated in Equation 8.

$$L_i = \mathrm{argmax}_{j \in [1:N_i]} \left\{ j - \sum_{m=1}^{j} |S_{\bar{\imath}}^{(m)}| \right\}$$ [Equation 8]

In addition, Equation 9 may be derived from Equation 2, and Equation 3.

$$y_i = \sum_{m=1}^{m_{max}} \sum_{j \in S_i^{(m)}} \gamma_{i,j}^{(m)} H_{i,j}^{(m)} v_{i,j}^{(m)} s_{i,j}^{(m)} + \sum_{m=1}^{N_i} \sum_{j \in S_{\bar{\imath}}^{(m)}} \gamma_{\bar{\imath},j}^{(m)} G_{\bar{\imath},j}^{(m)} v_{\bar{\imath},j}^{(m)} s_{\bar{\imath},j}^{(m)} + z_i$$ [Equation 9]

In addition, if defined as Equation 10, Equation 11 may be derived from Equation 9, and Equation 10.

$$u_{i,j}^{(m)} = \gamma_{i,j}^{(m)} [H_{i,j}^{(m)}]_{1:L_i} v_{i,j}^{(m)}$$ [Equation 10]
$$w_{i,j}^{(m)} = \gamma_{i,j}^{(m)} [G_{i,j}^{(m)}]_{1:L_i} v_{i,j}^{(m)}$$

$$[y_i]_{1:L_i} = \sum_{m=1}^{m_{max}} \sum_{j \in S_i^{(m)}} u_{i,j}^{(m)} s_{i,j}^{(m)} + \sum_{m=1}^{L_i} \sum_{j \in S_{\bar{\imath}}^{(m)}} w_{i,j}^{(m)} s_{\bar{\imath},j}^{(m)} +$$ [Equation 11]
$$[z_i]_{1:L_i}$$
$$= F_i s_i + [z_i]_{1:L_i}$$

Here, Equation 12 and Equation 13 are referred.

$$F_i = \Big[ u_{i,1}^{(1)}, \ldots, u_{i,|S_i^{(1)}|}^{(1)}, \ldots, u_{i,1}^{(m_{max})}, \ldots, u_{i,|S_i^{(m_{max})}|}^{(m_{max})},$$ [Equation 12]
$$\ldots, w_{i,1}^{(1)}, \ldots, w_{\bar{\imath},|S_{\bar{\imath}}^{(1)}|}^{(1)}, \ldots, w_{i,1}^{(L_i)}, \ldots, w_{\bar{\imath},|S_{\bar{\imath}}^{(L_i)}|}^{(L_i)} \Big]$$

$$s_i = \Big[ s_{i,1}^{(1)}, \ldots, s_{i,|S_i^{(1)}|}^{(1)}, \ldots, s_{i,1}^{(m_{max})}, \ldots, s_{i,|S_i^{(m_{max})}|}^{(m_{max})},$$ [Equation 13]
$$s_{\bar{\imath},1}^{(1)}, \ldots, s_{\bar{\imath},|S_{\bar{\imath}}^{(1)}|}^{(1)}, \ldots, s_{\bar{\imath},1}^{(L_i)}, \ldots, s_{\bar{\imath},|S_{\bar{\imath}}^{(L_i)}|}^{(L_i)} \Big]^T$$

At this time, in $[y_i]_{1:L}$, the $s_{i,j}^{(m)}$ is received as the data stream $\hat{s}_{i,j}^{(m)}$ by the zero-forcing as indicated in Equation 14.

$$\hat{s}_{i,j}^{(m)} = \lfloor (F_i^+ F_i)^{-1} \rfloor_{\sum_{k=1}^{m-1} |s_i^{(k)}|+j} F_i^+ [y_i]_{1:L_i}$$

$$= s_{i,j}^{(m)} + [(F_i^+ F_i)^{-1}]_{\sum_{k=1}^{m-1} |s_i^{(k)}|+j} F_i^+ [z_i]_{1:L_i}$$

[Equation 14]

Finally, a transmission rate $r_{i,j}^{(m)}$ like Equation 15 may be achieved through the signal to noise ratio (SNR) for the reception data stream signal $\hat{s}_{i,j}^{(m)}$ of Equation 14.

$$r_{i,j}^{(m)} = \log\left(1 + \frac{P}{\left\| [(F_i^+ F_i)^{-1}]_{\sum_{k=1}^{m-1} |s_i^{(k)}|+j} F_i^+ \right\|^2}\right)$$

[Equation 15]

In addition, as the transmission power P is increased, the achievable transmission rate is increased as logP accordingly, the sum of the degree of freedom for each AP achievable through the suggested method of the present disclosure is indicated in Equation 16.

$$\sum_{m=1}^{m_{max}} |S_1^{(m)}| + \sum_{m=1}^{m_{max}} |S_2^{(m)}|$$

[Equation 16]

As described above, in order to analyze the dynamic interference alignment performance in the wireless communication system 100 according to an embodiment of the present disclosure, a simulation was accomplished.

Figure 6:
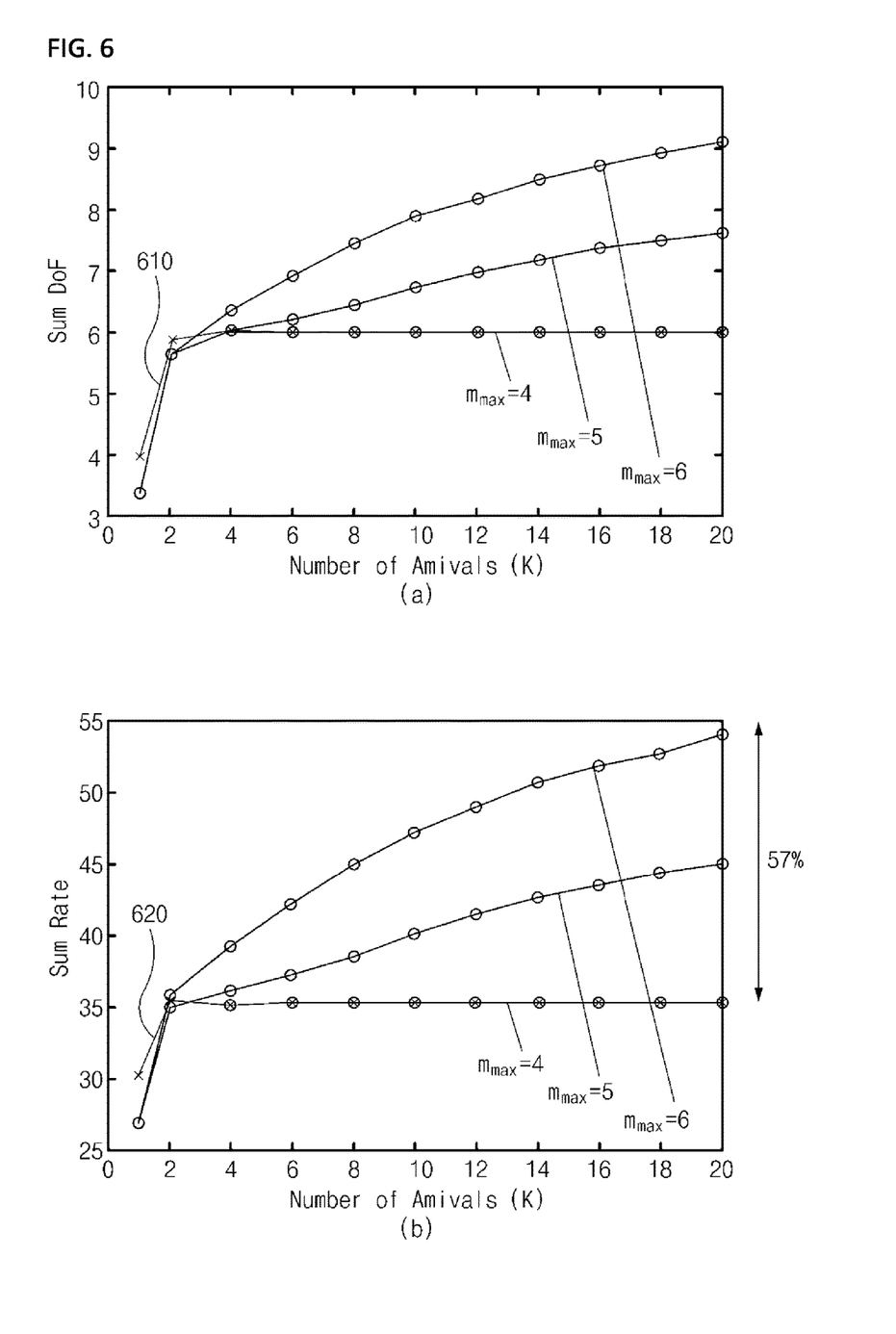
FIG. 6 is an exemplary performance graph for the degree of freedom and the transmission rate according to a dynamic interference alignment operation in an example of ($N_1=N_2=6$, $m_{max}=4, 5, 6$) a wireless communication system 100 according to an embodiment of the present disclosure.
Figure 7:
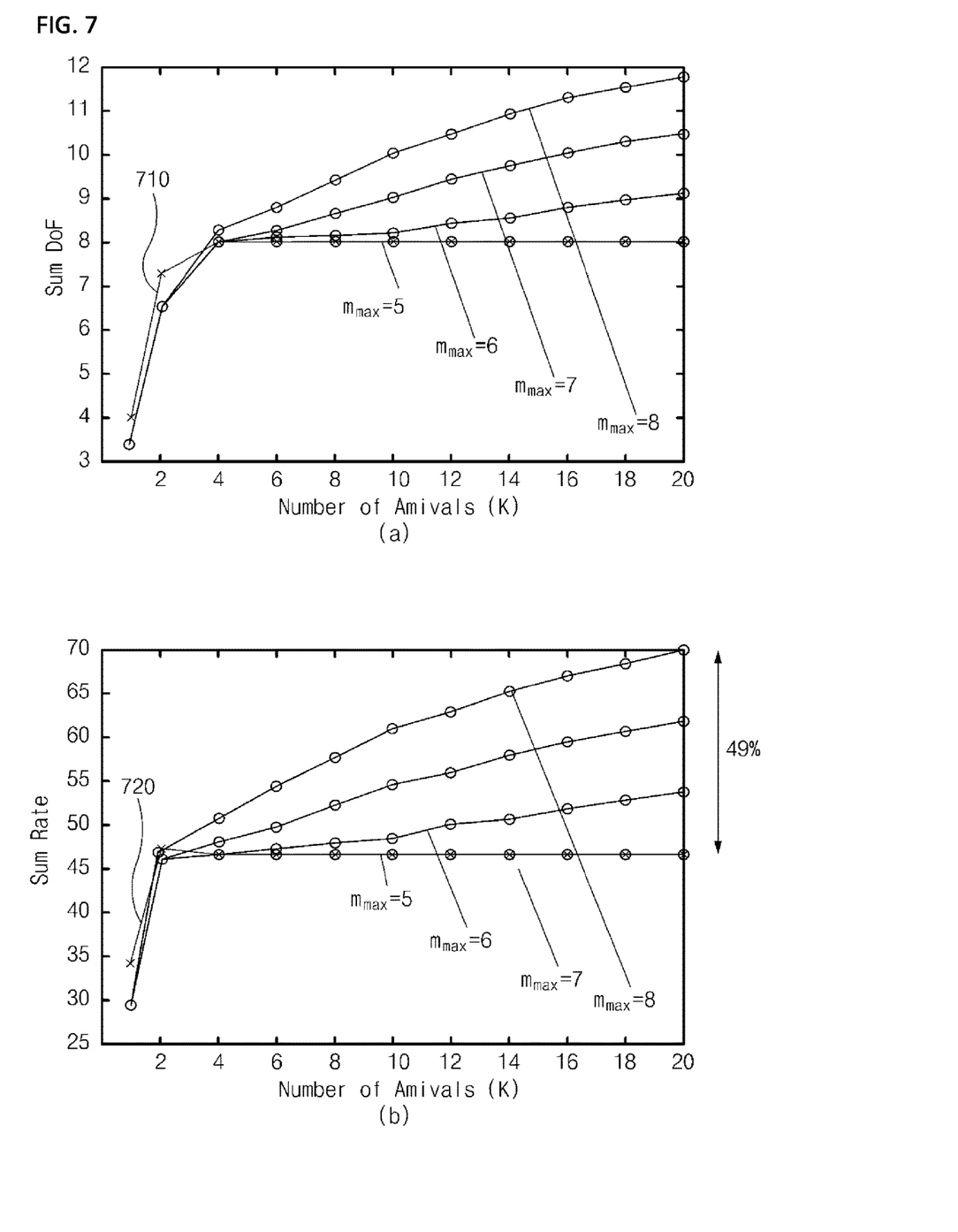
FIG. 7 is an exemplary performance graph for the degree of freedom and the transmission rate according to a dynamic interference alignment operation in an example of ($N_1=N_2=8$, $m_{max}=5, 6, 7, 8$) a wireless communication system 100 according to an embodiment of the present disclosure.

FIG. 6 is an exemplary performance graph for the degree of freedom and the transmission rate according to a dynamic interference alignment operation in an example of ($N_1=N_2=6$, $m_{max}=4, 5, 6$) a wireless communication system 100 according to an embodiment of the present disclosure. FIG. 7 is an exemplary performance graph for the degree of freedom and the transmission rate according to a dynamic interference alignment operation in an example of ($N_1=N_2=8$, $m_{max}=5, 6, 7, 8$) a wireless communication system 100 according to an embodiment of the present disclosure.

In FIG. 6 and FIG. 7, each user terminal receiving the service is assumed to terminate the service with a probability of 0.5 per slot, and it is assumed that K users attempt to connect in each cell every slot. In addition, it is assumed that the number of transmission antennas of the user terminal attempting to connect is evenly distributed between 1 and $m_{max}$.

First, to analyze the performance of the dynamic interference alignment according to K, as shown in FIG. 6, a simulation was performed by varying K with respect to P=20 dB, $N_1=N_2=6$, $m_{max}=4, 5, 6$. In FIG. 6, in comparison with the case of not applying the interference alignment 610 and 620, when applying the dynamic interference alignment of the present disclosure ($m_{max}=4, 5, 6$), it can be seen that a gain exists in the sum of the degree of freedom for each AP and the sum of transmission rate. That is, in the case of not applying the interference alignment 610 and 620, even if the $m_{max}$ is increased, the sum of the degree of freedom and the sum of transmission rate are not increased any longer. However, when applying the interference dynamic alignment of the present disclosure ($m_{max}=4, 5, 6$), the sum of the degree of freedom and the sum of transmission rate can be significantly improved, and, for example, in the case of $m_{max}=6$ based on P=20 dB in an example of FIG. 6, it is verified that the performance improvement is achieved approximately 57% in comparison with a conventional transmission rate sum.

Similarly, as shown in FIG. 7, a simulation was performed by varying K with respect to P=20 dB, $N_1=N_2=8$, $m_{max}=5, 6, 7, 8$. In FIG. 7, in comparison with the case of not applying the interference alignment 710 and 720, when applying the dynamic interference alignment of the present disclosure ($m_{max}=5, 6, 7, 8$), it can be seen that a gain exists in the sum of the degree of freedom for each AP and the sum of transmission rate. That is, in the case of not applying the interference alignment 710 and 720, even if the $m_{max}$ is increased, the sum of the degree of freedom and the sum of transmission rate are not increased any longer. However, when applying the interference dynamic alignment of the present disclosure ($m_{max}=5, 6, 7, 8$), the sum of the degree of freedom and the sum of transmission rate can be significantly improved, and, for example, in the case of $m_{max}=8$ based on P=20 dB in an example of FIG. 7, it is verified that the performance improvement is achieved approximately 49% in comparison with a conventional transmission rate sum.

As described above, the technical excellence of the present disclosure enables to (1) provide an efficient interference alignment method between the devices such as the user terminal having various numbers of antennas or the AP in a random access wireless network, (2) provide an adaptive interference alignment method corresponding to a wireless environment that changes in real-time, and (3) provide an algorithm efficiently update to add only some service users in comparison with a conventional technique that newly configures service users every slot. Further, the performance excellence of the present disclosure enables to (1) provide a significantly improved transmission rate in comparison with the conventional random access wireless network to which the interference alignment is not applied, and (2) provide an improved transmission rate in the environment that changes in real-time as the dynamic interference alignment of the present disclosure overcomes the technical limitations of the conventional interference alignment technique that fixes a space occupied by the interference among a signal space, when, in the conventional interference alignment technique, the transmission rate is remarkably differed depending on an interference space ratio and the performance deterioration is severe in the environment that changes in real-time.

The method and the apparatus for an interference alignment and a multi-antenna signal processing in a wireless communication system according to the present disclosure provides an efficient scheduling and an interference alignment technique between wireless communication devices such as an access point having various numbers of antennas. That is, the conventional interference alignment technique researched on the user/the access point having a single antenna, or the user/the access point having the same number of antennas. However, the present disclosure considers the environment of having different numbers of antennas between the users or the access points, and derives the efficient user scheduling and the interference alignment technique in such an environment.

In addition, the present disclosure provides the real-time user and interference alignment update technique in an environment in which the user newly connects to an access point every hour and terminates a service in a random access wireless network. That is, the interference alignment in the conventional cellular environment resets the user scheduling every hour and, through this, performs interference alignment. However, as described above, in an environment in which a new user attempts to connect to the AP every hour and some users terminate a service in a random access wireless network such as WLAN, the present disclosure efficiently derives a real-time user update and an interference alignment update technique to be adjusted to the user environment that changes in real time.

As described above, the present disclosure has an technical excellence which is possible to (1) provide an efficient interference alignment method between the devices such as the user terminal having various numbers of antennas or the AP in a random access wireless network, (2) provide an adaptive interference alignment method corresponding to a wireless environment that changes in real-time, and (3) provide an algorithm efficiently update to add only some service users in comparison with a conventional technique that newly configures service users every slot. Further, the present disclosure has a performance excellence which is possible to (1) provide a significantly improved transmission rate in comparison with the conventional random access wireless network to which the interference alignment is not applied, and (2) provide an improved transmission rate in the environment that changes in real-time as the dynamic interference alignment of the present disclosure overcomes the technical limitations of the conventional interference alignment technique that fixes a space occupied by the interference among a signal space, when, in the conventional interference alignment technique, the transmission rate is remarkably differed depending on an interference space ratio and the performance deterioration is severe in the environment that changes in real-time.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A communication method in a wireless communication system using an interference alignment, the method comprising:
receiving, by a first AP, a data stream by using $N_1$ (natural number) first reception antennas, and receiving, by a second AP, the data stream by using $N_2$ (natural number) second reception antennas, in the wireless communication system including the first AP and the second AP which receive the data stream through a transmission beam which one or more user terminals having m (natural number) transmission antennas within a given number transmit;
comparing, when user terminals newly connected to the first AP and the second AP exist, a number of user terminals already connected to each of the first AP and the second AP to obtain a comparison result; and
updating to add one or more of the user terminals which are newly connected to the first AP and the second AP to a set of connected user terminals based on the comparison result, and transmitting, by each terminal of the set of connected user terminals, linearly independent transmission beams by applying the interference alignment with respect to a plurality of the first reception antennas and the second reception antennas for the updated set of connected user terminals,
wherein updating to add one or more of the user terminals comprises selecting a user terminal having largest numbers of transmission antennas among the newly connected user terminals and adding the selected user terminal to the set of connected user terminals,
wherein transmitting linearly independent transmission beams comprises, when a number of transmission antennas of a corresponding user terminal connected to any one of the first AP or the second AP is equal to or less than a number of reception antennas of the other of the first AP or the second AP to which the corresponding user terminal is not connected, applying an interference nulling with respect to the transmission beams to the any one AP, by a user terminal having smaller number of the transmission antennas than that of the corresponding user terminal among the user terminals connected to the other AP.

2. The method of claim 1, wherein transmitting the linearly independent transmission beams comprises applying the interference alignment to use a signal space in a preset order, when a user terminal connected to any one of the first AP or the second AP uses a portion of a signal space that the other of the first AP or the second AP forms.

3. The method of claim 2, further comprising applying the interference alignment by adding a signal space of a corresponding user terminal according to an occurrence of a user terminal which terminates a service through the first AP or the second AP.

4. The method of claim 1, wherein updating to add one or more of the user terminals comprises adding, among the newly connected user terminals, one or more user terminals connected to one of the first AP and the second AP having a fewer number of connected user terminals to the set of connected user terminals.

5. The method of claim 1, wherein transmitting linearly independent transmission beams comprises, when a number of transmission antennas of a corresponding user terminal connected to one of the first AP or the second AP is larger than a number of reception antennas of the other of the first AP or the second AP to which the corresponding user terminal is not connected, applying an interference nulling with respect to all transmission beams to the one AP, by user terminals connected to the other AP.

6. A wireless communication system using an interference alignment, the system comprising:
a first AP and a second AP configured to receive a data stream through a transmission beam which one or more user terminals having m (natural number) transmission antennas within a given number transmit, wherein the first AP receives the data stream by using $N_1$ (natural number) first reception antennas and the second AP receives the data stream by using $N_2$ (natural number) second reception antennas; and
a controller configured to, when user terminals newly connected to the first AP and the second AP exist, compare a number of user terminals already connected to each of the first AP and the second AP to obtain a comparison result, to update to add one or more of the user terminals which are newly connected to the first AP and the second AP to a set of connected user terminals based on the comparison result, and set each terminal of the set of connected user terminals to transmit linearly independent transmission beams by applying the interference alignment with respect to a plurality of the first reception antennas and the second reception antennas for the updated set of connected user terminals, and
wherein the controller selects a user terminal having largest numbers of transmission antennas among the newly connected user terminals and adds the selected user terminal to the set of connected user terminals, wherein, when a number of transmission antennas of a corresponding user terminal connected to any one of the first AP or the second AP is equal to or less than a number of reception antennas of the other of the first AP or the second AP to which the corresponding user terminal is not connected, the controller controls to apply an interference nulling with respect to the transmission beams to the any one AP by a user terminal having smaller number of the transmission antennas than that of the corresponding user terminal among the user terminals connected to the other AP.

7. The system of claim 6, wherein the controller applies the interference alignment to use a signal space in a preset order, when a user terminal connected to any one of the first AP or the second AP uses a portion of a signal space that another of the first AP or the second AP forms.

8. The system of claim 7, wherein the controller applies the interference alignment by adding a signal space of a corresponding user terminal according to an occurrence of a user terminal which terminates a service through the first AP or the second AP.

9. The system of claim 6, wherein, the controller updates to add, among the newly connected user terminals, one or more user terminals connected to one of the first AP and the second AP having a fewer number of connected user terminals to the set of connected user terminals.

10. The system of claim 6, wherein, when a number of transmission antennas of a corresponding user terminal connected to one of the first AP or the second AP is larger than a number of reception antennas of the other of the first AP or the second AP to which the corresponding user terminal is not connected, the controller controls to apply an interference nulling with respect to all transmission beams to the one AP by user terminals connected to the other AP.

* * * * *